US007643021B2

(12) United States Patent
Pai et al.

(10) Patent No.: US 7,643,021 B2
(45) Date of Patent: Jan. 5, 2010

(54) DRIVING SYSTEM AND DRIVING METHOD FOR MOTION PICTURE DISPLAY

(75) Inventors: Feng-Ting Pai, Hsinchu (TW); Chun-Fu Wang, Hsinchu Hsien (TW)

(73) Assignee: Hannstar Display Corporation, Taipei (TW)

( * ) Notice: Subject to any disclaimer, the term of this patent is extended or adjusted under 35 U.S.C. 154(b) by 614 days.

(21) Appl. No.: 11/013,828

(22) Filed: Dec. 16, 2004

(65) Prior Publication Data

US 2005/0275646 A1 Dec. 15, 2005

(30) Foreign Application Priority Data

Jun. 14, 2004 (TW) .............................. 93117066 A

(51) Int. Cl.
*G06F 3/038* (2006.01)

(52) U.S. Cl. ...................................................... 345/204

(58) Field of Classification Search ......... 345/600–616, 345/204, 690, 254, 89, 205–207, 691–693
See application file for complete search history.

(56) References Cited

U.S. PATENT DOCUMENTS 5,438,373 A * 8/1995 Cummins ................... 345/605
6,215,468 B1 * 4/2001 Van Mourik ................ 345/605
6,340,994 B1 * 1/2002 Margulis et al. ............ 348/625
6,353,435 B2 * 3/2002 Kudo et al. ................. 345/204
6,987,499 B2 * 1/2006 Yamaguchi et al. ........... 345/89
7,006,069 B2 * 2/2006 Tanaka et al. ................. 345/98
7,113,163 B2 * 9/2006 Nitta et al. .................. 345/102
7,129,922 B2 * 10/2006 Shin ............................ 345/90
7,148,868 B2 * 12/2006 Lee ............................. 345/87
2004/0075631 A1 * 4/2004 Ishiguchi ..................... 345/96
2005/0068343 A1 * 3/2005 Pan et al. .................... 345/690

* cited by examiner

*Primary Examiner*—Sumati Lefkowitz
*Assistant Examiner*—Robert E Carter, III
(74) *Attorney, Agent, or Firm*—Thomas, Kayden, Horstemeyer & Risley

(57) ABSTRACT

A driving system and a driving method for motion pictures are described, using an input, a black image insertion module, an advanced overdrive module, and a partial frame rate control module. The input receives a first frame and a second frame in order. The black image insertion module inserts a single fixed gray level frame between the first frame and the second frame. The advanced overdrive module increases the second frame to (n+a) bits and converts the same to the overdrive image, in which the first frame and the second frame are n bits. The partial frame rate control module smoothes the overdrive image and converts the same to an output image to refresh the pixels from the single fixed gray level frame to the second frame.

5 Claims, 7 Drawing Sheets

Initial Gray Level Voltage

| Target Gray Level Voltage | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 32 | 16 | 0 | 0 | 0 | 0 | 0 | 0 | 0 | 0 | 0 | 0 | 0 | 0 | 0 | 0 | 0 |
| 32 | 48 | 48 | 32 | 16 | 16 | 16 | 16 | 0 | 0 | 0 | 0 | 0 | 0 | 0 | 0 | 0 | 0 |
| 48 | 80 | 64 | 64 | 48 | 32 | 32 | 32 | 16 | 16 | 16 | 0 | 0 | 0 | 0 | 0 | 0 | 0 |
| 64 | 96 | 80 | 80 | 80 | 64 | 48 | 64 | 32 | 32 | 32 | 16 | 16 | 0 | 0 | 0 | 0 | 0 |
| 80 | 112 | 96 | 96 | 96 | 96 | 80 | 80 | 64 | 48 | 48 | 32 | 32 | 16 | 16 | 0 | 0 | 0 |
| 96 | 144 | 128 | 128 | 128 | 112 | 112 | 96 | 80 | 80 | 64 | 48 | 64 | 32 | 32 | 16 | 0 | 0 |
| 112 | 160 | 144 | 144 | 160 | 144 | 128 | 128 | 112 | 96 | 96 | 80 | 80 | 48 | 48 | 32 | 0 | 0 |
| 128 | 192 | 160 | 176 | 176 | 160 | 160 | 144 | 144 | 128 | 112 | 112 | 112 | 80 | 80 | 48 | 32 | 0 |
| 144 | 208 | 176 | 176 | 208 | 192 | 192 | 160 | 176 | 160 | 144 | 128 | 128 | 112 | 96 | 80 | 48 | 16 |
| 160 | 224 | 224 | 224 | 240 | 224 | 208 | 192 | 208 | 192 | 176 | 160 | 160 | 128 | 128 | 112 | 80 | 32 |
| 176 | 240 | 240 | 240 | 255 | 240 | 240 | 208 | 224 | 224 | 208 | 192 | 176 | 160 | 160 | 128 | 96 | 48 |
| 192 | 255 | 255 | 255 | 255 | 240 | 240 | 240 | 240 | 240 | 240 | 224 | 208 | 192 | 176 | 160 | 128 | 64 |
| 208 | 255 | 255 | 255 | 255 | 255 | 255 | 255 | 255 | 240 | 240 | 224 | 240 | 224 | 208 | 176 | 160 | 80 |
| 224 | 255 | 255 | 255 | 255 | 255 | 255 | 255 | 255 | 255 | 255 | 255 | 255 | 240 | 240 | 224 | 192 | 112 |
| 240 | 255 | 255 | 255 | 255 | 255 | 255 | 255 | 255 | 255 | 255 | 255 | 255 | 255 | 255 | 255 | 240 | 160 |
| 256 | 256 | 256 | 256 | 256 | 256 | 256 | 256 | 256 | 256 | 256 | 256 | 256 | 256 | 256 | 256 | 256 | 256 |

Fig. 1
(PRIOR ART)

$$G_{n'}[9:0] = G_n[7:0] * 4 + Boost(G_n)$$

$$G_{n''}[7:0] = G_{n'}[9:2] + PFRC(G_{n'}[1:0], Frame)$$

DRIVING SYSTEM AND DRIVING METHOD FOR MOTION PICTURE DISPLAY

RELATED APPLICATIONS

The present application is based on, and claims priority from, Taiwan Application Serial Number 93117066, filed Jun. 14, 2004, the disclosure of which is hereby incorporated by reference herein in its entirety.

FIELD OF THE INVENTION

The present invention relates to a driving system and a driving method for motion pictures, and more particularly, to a driving system and a driving method for motion pictures of a thin film transistor liquid crystal display (TFT LCD).

BACKGROUND OF THE INVENTION

When an appropriate gray level voltage is applied to a pixel of a TFT LCD panel, the angle of liquid crystal molecule in the pixel changes correspondingly. This angle change further alters transmittance of the TFT-LCD panel so a desired gray level can be achieved. However, due to the intrinsic property of liquid crystal molecule, if the gray level has to change dramatically during two successive refresh periods, the desired angle change may not be achieved in one refresh period. This results in a blurred display, and the situation is particularly bad for a motion picture display.

One solution to this problem is to use an over-drive technique. The over-drive technique applies a gray level voltage (over-drive gray level voltage) higher than originally required, so the angle of liquid crystal is changed from the initial gray level to the target gray level in a refresh period. The relationship between the initial gray level voltage, the target gray level voltage, and the over-drive gray level voltage can be obtained from a Look-Up Table. The Look-Up Table is a table providing the corresponding over-drive gray level voltage when the pixel has to change from an initial gray level voltage to a target gray level voltage. FIG. 1 shows a Look-Up Table of an 8-bits driving system. The horizontal axis represents the initial gray level voltage, and the vertical axis represents the target gray level voltage. The intersection is the over-drive gray level voltage applied to the pixel. For example, if the initial gray level voltage is $V_{32}$, and the target gray level voltage is $V_{64}$, the over-drive gray level voltage applied to the pixel would be $V_{80}$.

FIG. 2 is a block diagram showing a conventional driving system utilizing the over-drive technique. Timing controller 201 retrieves Gn frame image data from an image data source, and retrieves previous Gn−1 frame image data from a frame buffer 202. Timing controller 201 then compares the Gn and Gn−1 frame image data and addresses the pixels that need to be updated. Subsequently, timing controller 201 retrieves the Look-Up Table stored in a memory 203, and converts the image data in the updated pixels to a corresponding over-drive gray level voltage. The over-drive gray level voltage is then applied to the pixel via a source driver.

However, the driving system utilizing the over-drive technique still has some drawbacks. First, only the pixels where image data has to change during the two successive refresh periods is updated. This requires several frame buffers to store the previous frame image data in order to compare the image data in the same pixel during the two successive refresh periods. However, frame buffers are expensive and dramatically increase the manufacturing cost. Besides, the Look-Up Table utilized in the over-drive technique records the increment, and SRAM needs to be put in the timing controller, so the design of the circuit is complicated. Furthermore, the chip size is bigger and the power consumption thereof is higher. On the other hand, the pictures with high gray level are saturated, and the color depth is thus affected.

SUMMARY OF THE INVENTION

Hence, an objective of the present invention is to provide a driving system and a driving method for motion pictures in which no frame buffer is needed, so cost are reduced.

Another objective of the present invention is to provide a driving system and a driving method for motion pictures in which the capacity of the memory can be decreased.

According to the aforementioned objectives, the present invention provides a driving system for motion pictures suitable for driving a plurality of pixels. The driving system comprising an input receiving a first frame image and a second frame image in order, a black image insertion module inserting a frame image of single and fixed gray level between the first frame image and the second frame image, and an advanced over drive module adding m bits to the second frame image to acquire an over drive image. The first frame image and the second frame image are n bits, and a partial frame rate control module smoothes the over drive image and produces an output image to make the pixels change from the frame image of single and fixed gray level to the second frame image.

The present invention provides a driving method for image data in motion pictures, in which the image data comprises a plurality of pixels. The driving method comprising the following steps. First, the pixels are refreshed from a first frame image to a black frame. Then, a second frame image is converted to an over drive image by increasing the second frame image to n+m bits, in which second frame image is n bits. Afterwards, the over drive image is smoothed and an output image is produced to make the pixels change from the black frame to the second frame image.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 illustrates a Look-Up Table of an 8-bits driving system;

DETAILED DESCRIPTION OF THE PREFERRED EMBODIMENT

The present invention provides a driving system and a driving method for motion pictures. The present invention comprises three modules connected in series: a black image insertion module, an advanced overdrive module, and a partial frame rate control module. The black image insertion module converts the image data written in the pixels into black data. The advanced overdrive module converts the data from n bits to (n+a) bits and adds a boost to get an overdrive image, in which a is a positive integer. The partial frame rate control module smoothes the overdrive image.

Figure 2:
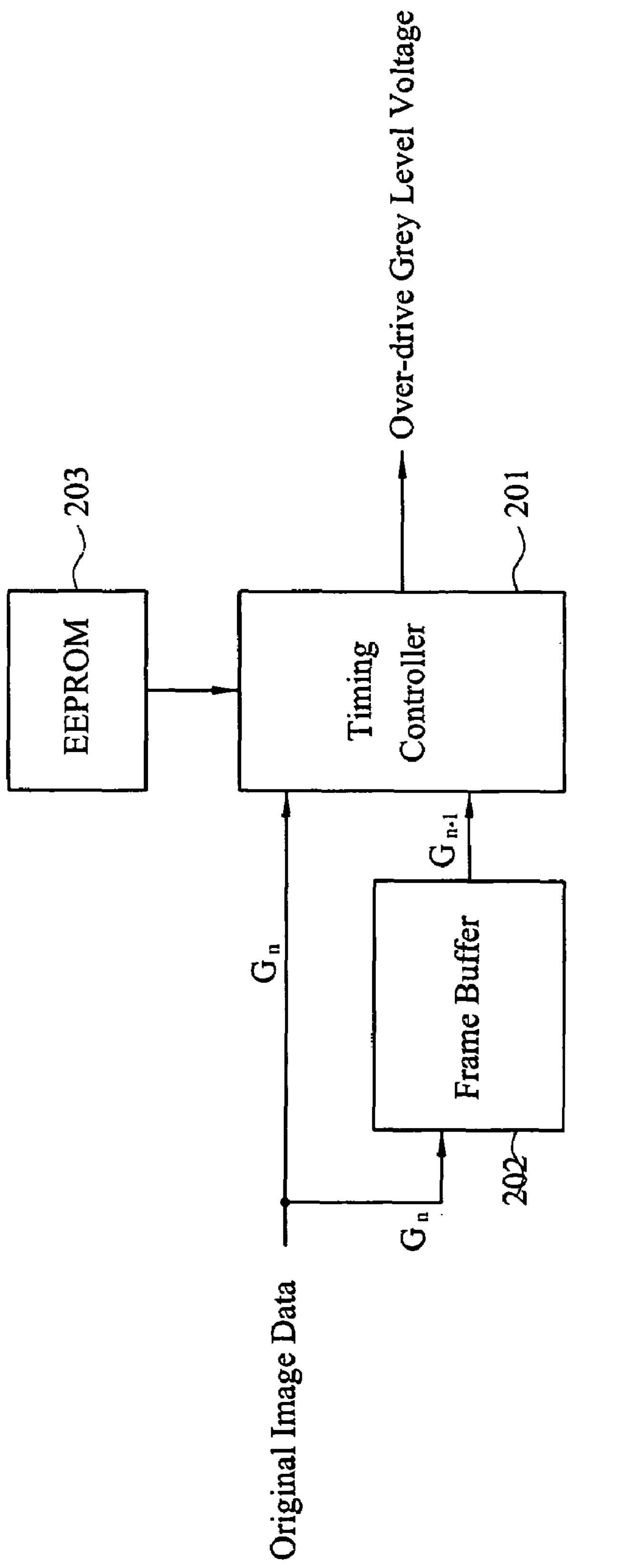
Fig. 2 (PRIOR ART)
FIG. 2 illustrates a block diagram showing a conventional driving system utilizing the over-drive technique.
Figure 3:
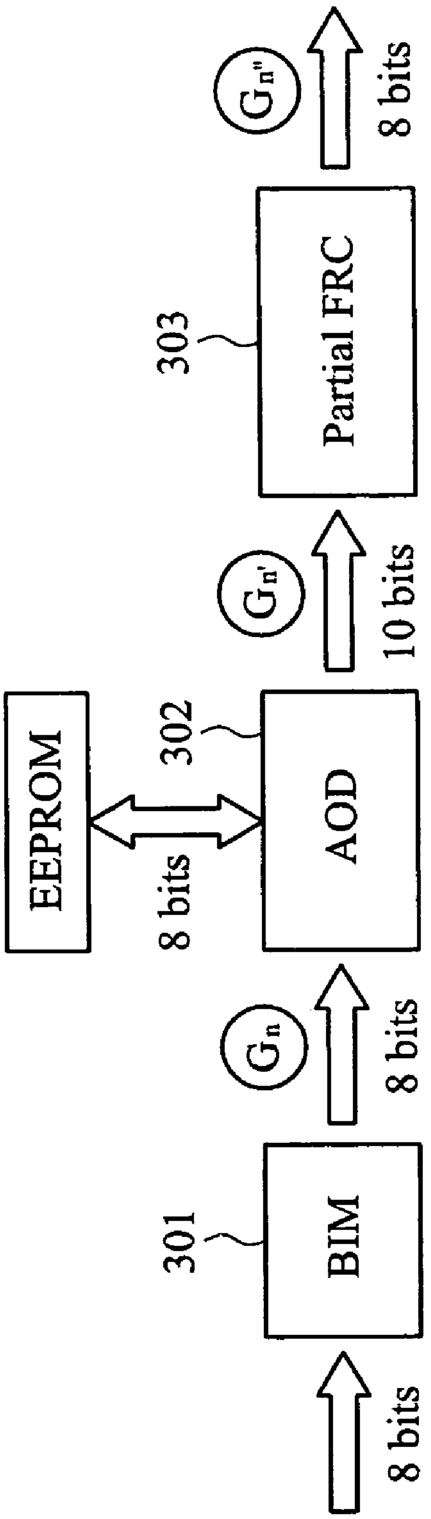
FIG. 3 illustrates the flow diagram of a preferred embodiment of the present invention.

Reference is made to FIG. 3, which illustrates the flow diagram of a preferred embodiment of the present invention in which image data with 8 bits is taken as an example. After image data of a frame is written, the black image insertion module 301 refreshes the frame to a black frame. Then, the advanced overdrive module 302 begins to process image data of a next frame, so that the image data is converted from 8 bits to 10 bits and added a boost according to a Look-Up Table to obtain an overdrive image. Afterwards, the partial frame rate control module 303 smoothes the overdrive image, wherein two adjacent gray levels can be subdivided into three sub-gray levels with the use of the boost. Further, due to the black frames inserted by the black image insertion module 301, the Look-Up Table can be simplified to take one column data into account at a time. Since an object of the present invention is to simplify the driving circuit, inserting the black frames make the initial gray level voltage of pixels in each frame the same. Thus, frame buffers are not needed, and the Look-Up Table can be simplified. To make the initial gray level voltage of each pixel identical, besides black frames, any single gray level frame can be chosen to replace black frames for insertion into image data of each frame.

Figure 4:
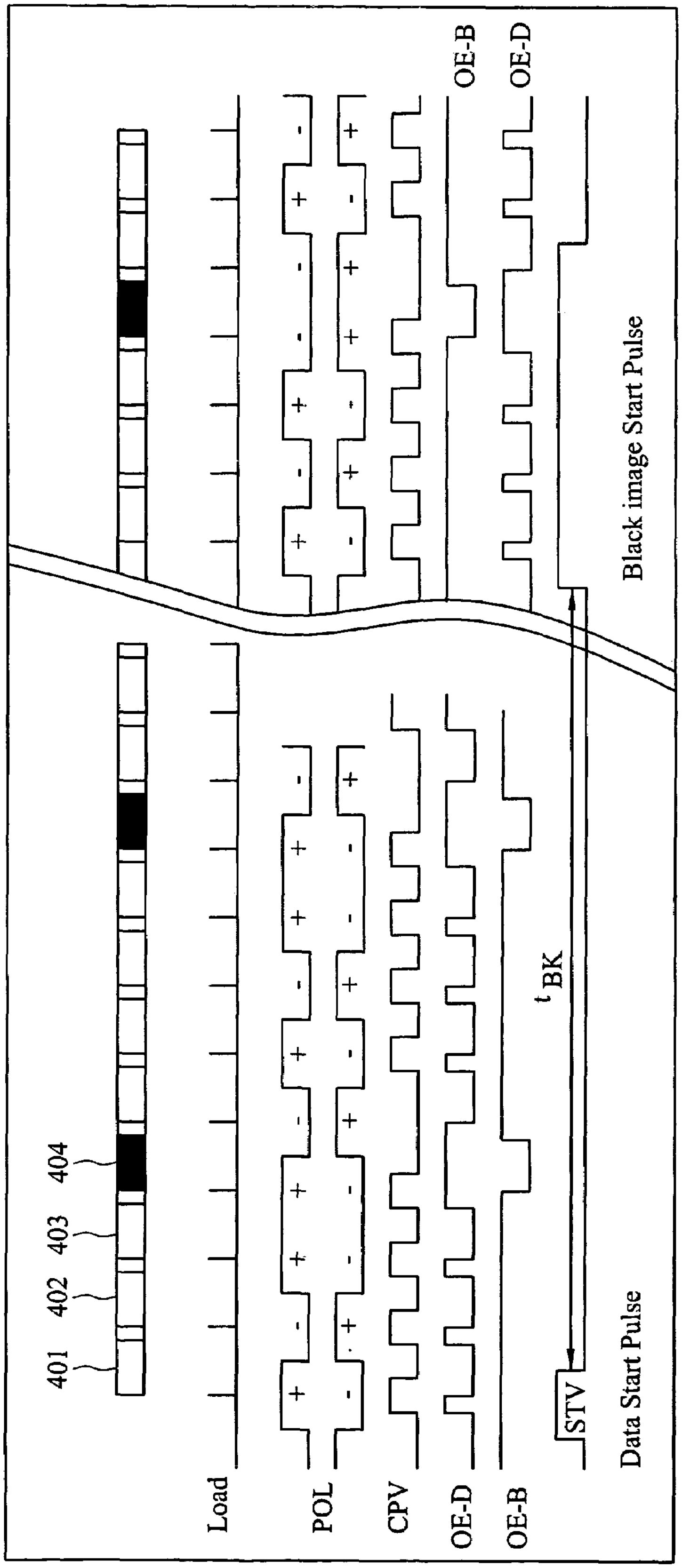
FIG. 4 illustrates the driving method of the black image insertion module.

Reference is made to FIG. 4, which illustrates the driving method of the black image insertion module. When OE_D is low, data is written. When OE_B is low, the black frame is written. As shown in the drawing, when OE_D is low and OE_B is high, data 401, data 402, and data 403 are written. When OE_D is high and OE_B is low, the black frame 404 is written. Since the polarity of pixels need to be zero, the electrical property of data is interlaced with positive and negative. The electrical property of the black frame is opposite that of the previous black frame. When there is a data start pulse in the vertical signal STV, image data of a first frame with n bits are written. After a period of time $t_{BK}$, there is a black image start pulse in the vertical signal STV, so the black image insertion module refreshes the frame to a black frame with n bits. Hence, all pixels of the first frame change from different display gray levels to the same black display gray level. Later, when the advanced overdrive module overdrives the image data of a second frame, all pixels can change from the same black display gray level to display gray level of the second frame. Thus, a frame buffer for comparing the image data of the first frame and the image data of the second frame can be omitted.

Figure 5:
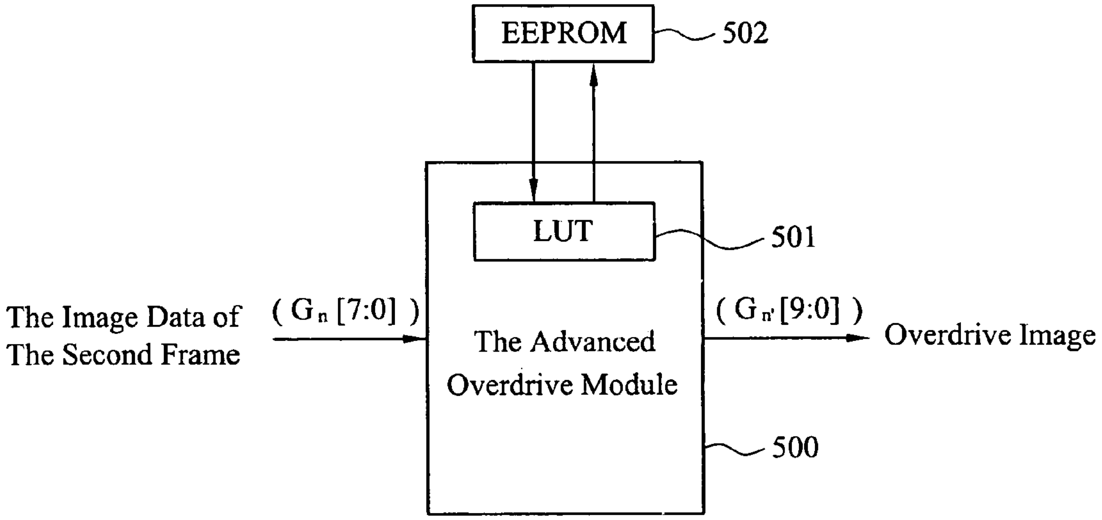
FIG. 5 illustrates the block diagram of the advanced over-drive module.

Reference is made to FIG. 5, which illustrates the block diagram of the advanced overdrive module 500. After inputting the image data of the second frame with n bits, the advanced overdrive module 500 converts them into an overdrive image data with n+a bits (a is a positive integer). The algorithm is as follows:

$$Gn'[n+a-1:0]=Gn[n-1:0]\times 2^{(a)}+\text{Boost}(Gn),$$

where Gn'[n+a−1:0] is the overdrive image data with n+a bits, Gn[n−1:0] is the image data of the second frame with n bits, and Boost(Gn) is a boost with n bits. As shown in the drawing, the advanced overdrive module 500 multiplies the image data of 8 bits by $2^2$; that is, 2 bits are added for the following subdivision of gray levels. Thus, the image data is increased from 8 bits to 10 bits, and a Boost(Gn) is added in accordance with a Look-Up Table 501 to obtain the overdrive image data. The boost may be obtained from the corresponding over-drive gray level voltage by accessing the Look-Up Table 501 in the EEPROM 502. Meanwhile, since each frame has been refreshed to the black frame, that is, the display gray level of each pixel has been changed to the same black display gray level as an initial gray level. Therefore, the relationship between the initial gray level voltage, the target gray level voltage, and the over-drive gray level voltage can be simplified to one column in the Look-Up Table.

Figure 6:
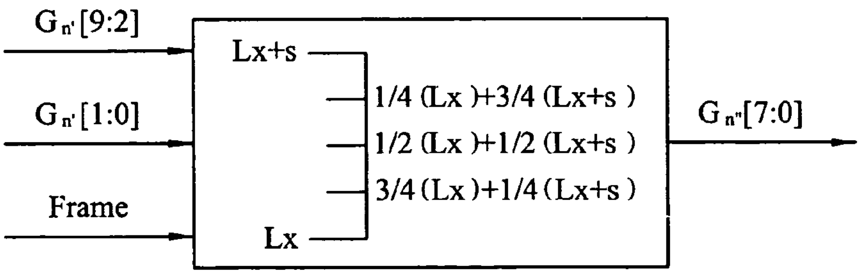
FIG. 6 illustrates the block diagram of the partial frame rate control module.
Figure 7A:
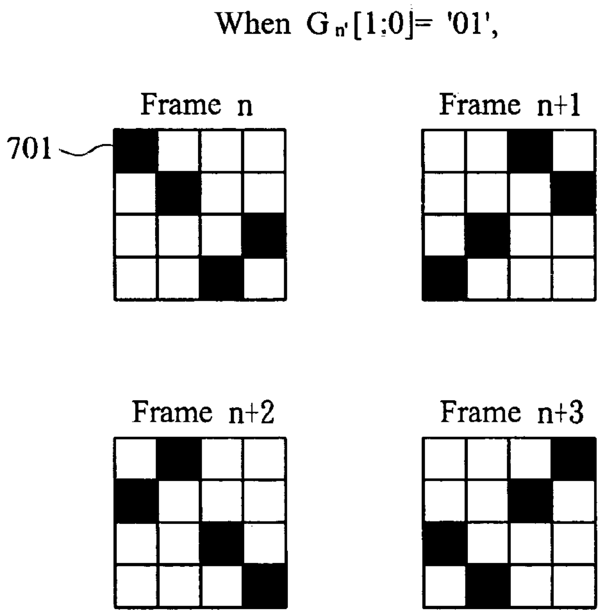
FIGS. 7A to 7C illustrate the relationship between the pattern and the frame used by the partial frame rate control module.
Figure 7B:
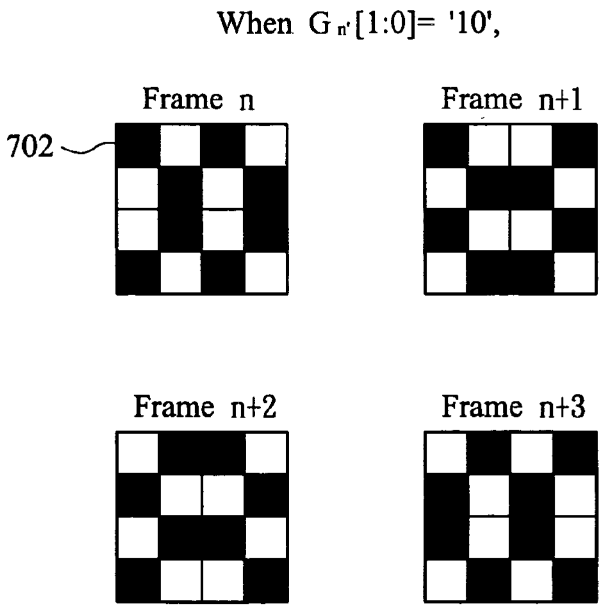
Figure 7C:
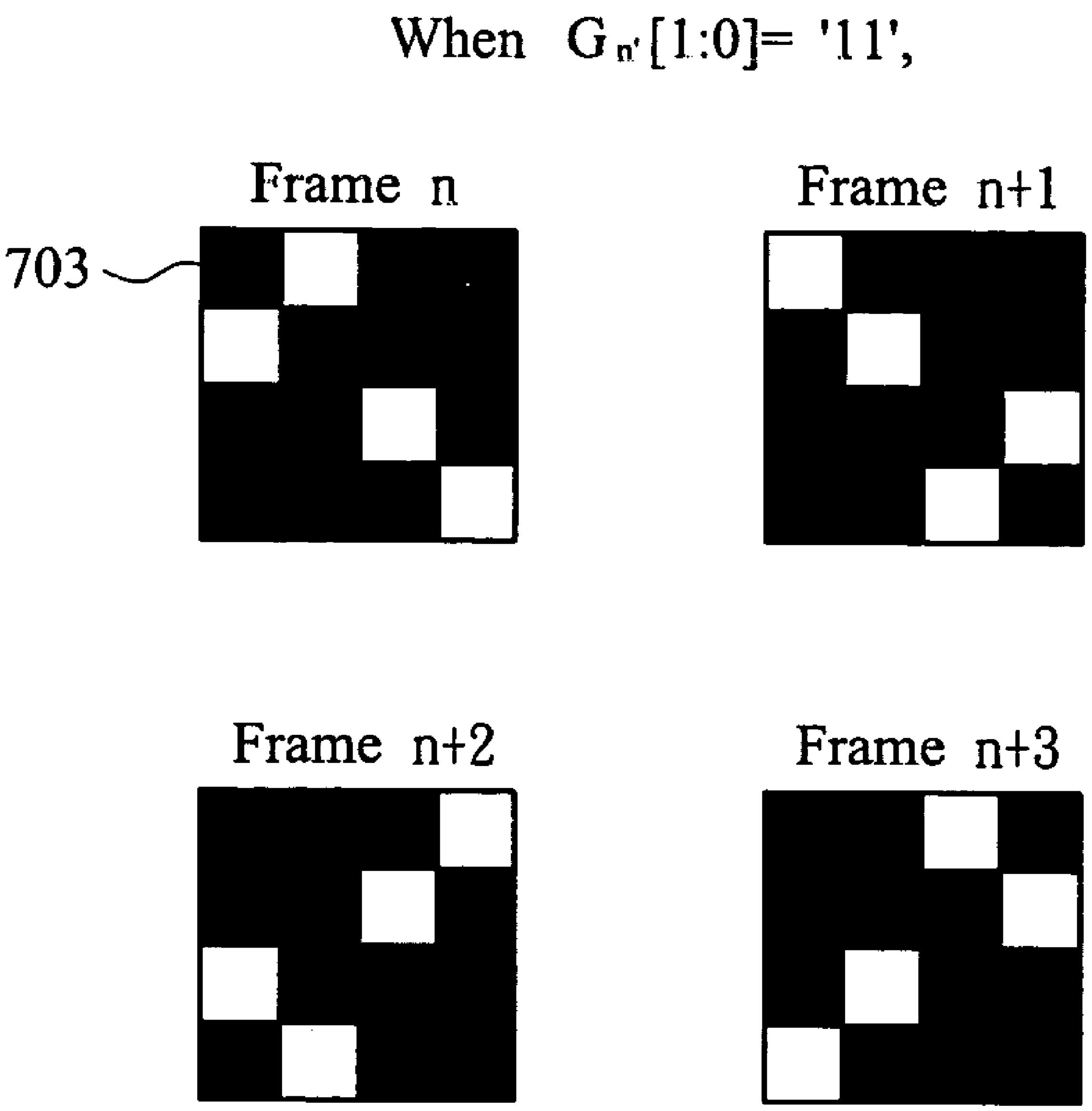

Reference is made to FIG. 6, which illustrates the block diagram of the partial frame rate control module. The partial frame rate control module aims to smooth the over-drive image data by subdividing two adjacent gray levels into several sub-gray levels. Thus, the patterns will be smoothed and few glitters will be sensed. The algorithm is as follows:

$$Gn''[n-1:0]=Gn'[n+a-1:a]+PFRC(Gn'[a-1:0],\ \text{Frame}),$$

where Gn"[n−1:0] is output image data with n bits, Gn'[n+a−1:a] is an output gray level Lx with n bits of the over-drive image data with (n+a) bits, and PFRC(Gn'[a−1:0], Frame) is an output of the relationship between the pattern and the frame. When Gn'[a−1:0]=0, the partial frame rate control module outputs 0. When Gn'[a−1:0]≠0, the partial frame rate control module outputs gray level Lx+s with n bits in accordance with the predetermined relationship between the pattern and the frame, where s is a positive integer. As shown in FIG. 6, the partial frame rate control module subdivides the gray level Lx and Lx+s into three sub-gray levels: "01", "10", and "11", denoted as ¾(Lx)+¼(Lx+s), ½(Lx)+½(Lx+s), and ¼(Lx)+¾(Lx+s), respectively. When the sub-gray level is "01", three quarters of the pixels in each frame output Lx, and one quarter of the pixels output Lx+s. When the sub-gray level is "10", half of the pixels in each frame output Lx, and the other half of the pixels output Lx+s. Similarly, when the sub-gray level is "11", one quarter of the pixels in each frame output Lx, and three quarters of the pixels output Lx+s. Reference is made simultaneously to FIGS. 7A-C, which illustrate the predetermined relationship between the pattern and the frame used by the partial frame rate control module. For visually smoothing the image and preventing glitters, one pixel may output gray level Lx or Lx+s in different frames of one cycle having $2^a$ frames. For example, when Gn'[1:0]='01', a=2, s=1, the partial frame rate control module outputs the relationship between the pattern and the frame as shown in FIG. 7A, in which the black parts represent the gray level Lx+1 and the white parts stand for the gray level Lx. That is, in FIG. 7A, pixel 701 outputs the gray level Lx+1 in the $n^{th}$ frame, and outputs the gray level Lx in the $n+1^{th}$, the $n+2^{th}$, and the $n+3^{th}$ frame. Similarly, when Gn'[1:0]='10', the partial frame rate control module outputs the relationship between the pattern and the frame as shown in FIG. 7B. That is, in FIG. 7B, pixel 702 outputs the gray level Lx+1 in the $n^{th}$ and the $n+1^{th}$ frame, and outputs the gray level Lx in the $n+2^{th}$ and the $n+3^{th}$ frame. When Gn'[1:0]='11', the partial frame rate control module outputs the relationship between the pattern and the frame as shown in FIG. 7C. That is, in FIG. 7C, pixel 703 outputs the gray level Lx+1 in the $n^{th}$ and the $n+2^{th}$ frame, and outputs the gray level Lx in the $n+1^{th}$, and the $n+3^{th}$ frame.

Hence, the advantages of the present invention are as follows. First, the driving system of the present invention inserts black frames after image data of each frame are written, so the over-drive can be processed directly according to the Look-UpTable without storing the previous frame. Furthermore, the partial frame rate control module of the present invention smoothes the patterns of the image and prevents glitters detected by users.

As is understood by a person skilled in the art, the foregoing preferred embodiments of the present invention are illustrative of the present invention rather than limiting of the present invention. It is intended that various modifications and similar arrangements are covered within the spirit and scope of the appended claims, the scope of which should be accorded the broadest interpretation so as to encompass all such modifications and similar structures.

What is claimed is:

1. A method for driving image data on a display, wherein the display comprises a plurality of pixels, the driving method comprising:

writing a first frame image data into the pixels and then refreshing the pixels from the first frame image data to a black frame data, wherein the first frame image data and the black fame data both are of n bits;

inputting a second frame image data Gn to an advance overdrive module, wherein the second frame image data is of n bits;

converting the second frame image data of n bits into a calculated image data, wherein a is a positive integer, and the calculated image data is acquired from multiplying the second frame image data Gn by $2^{(a)}$;

after producing the calculated image data, adding a boost of n bits into the calculated image data to acquire an overdrive image data Gn' of (n+a) bits, wherein the boost is of n bits and acquired according to the black frame data and the second frame image data Gn in a Look-Up table, and the overdrive image data Gn' is of (n+a) bits;

selecting n bits data from the overdrive image data Gn' having (n+a) bits as a selected image data; and using a partial frame rate control module to output an output image data Gn" to a corresponding frame of multiple frames which are utilized to smooth the overdrive image, wherein the output image data Gn" is of n bits, and the output image data Gn" is acquired by combining the selected image data and an output gray level data of n bits of the relationship between a pattern and the corresponding frame together.

2. The method of claim 1, wherein the step of refreshing the pixels from the first frame image to the black frame is processed in a black image insertion module.

3. The method of claim 1, wherein the partial frame rate control module outputs the output image data Gn" in accordance with an algorithm, and the algorithm is Gn"[n−1:0]= Gn'[n+a−1:a]+ PFRC(Gn'[a−1:0], Frame), where Gn"[n−1:0] is the output image of n bits, Gn'[n+a−1:a] is the selected image data of n bits in the over drive image of (n+a) bits, and PFRC(Gn'[a−1:0], Frame) is the output gray level data of n bits of the relationship between the pattern and the corresponding frame.

4. The method of claim 3, wherein the partial frame rate control module makes one pixel output the selected image data in at least a frame of a cycle and output the output gray level data in the other frames of the cycle, and each cycle has $2^a$ frames.

5. The method of claim 1, wherein the Look-Up-Table is an one-column table.

* * * * *